United States Patent [19]

Ochs

[11] Patent Number: 4,886,015

[45] Date of Patent: Dec. 12, 1989

[54] MODULAR FLOTATION SUPPORT COLLAR ASSEMBLY FOR AQUACULTURE FISH PEN

[76] Inventor: Gordon M. Ochs, 740 S. 28th Street, Washougal, Wash. 98671

[21] Appl. No.: 176,604

[22] Filed: Apr. 1, 1988

[51] Int. Cl.$^4$ .............................................. A01K 63/00
[52] U.S. Cl. ........................................ 119/3; 114/267; 441/44
[58] Field of Search ................. 119/3, 4; 114/49, 266, 114/267; 43/103, 104; 441/44, 45, 46, 50, 52

[56] References Cited

U.S. PATENT DOCUMENTS

| | | | |
|---|---|---|---|
| 2,401,453 | 6/1946 | Bell et al. ........................... | 441/45 X |
| 3,109,183 | 11/1963 | Overmyer ............................. | 441/46 |
| 3,446,172 | 5/1969 | Morton et al. ....................... | 114/267 |
| 4,429,659 | 2/1984 | Holyoak ............................... | 43/103 X |
| 4,610,219 | 9/1986 | Morimura ............................. | 119/3 |

FOREIGN PATENT DOCUMENTS 2016135 10/1971 Fed. Rep. of Germany .......... 119/3

OTHER PUBLICATIONS

Brochure, SEA CORRAL, Comox, B.C.

*Primary Examiner*—Robert P. Swiatek
*Attorney, Agent, or Firm*—Chernoff, Vilhauer, McClung & Stenzel

[57] ABSTRACT

A modular marine flotation collar for aquaculture applications is disclosed. Component collar segments are sealed by bulkheads including a connecting flange. Standard component collar segments may be assembled into a desired configuration by flange-to-flange connection of adjacent collar segments. A plurality of elongate tubular members having arcuate recesses conforming to the outer perimeters of supporting collar segments are arranged transversely atop the collar assembly so as to provide for the construction of an elevated walkway.

12 Claims, 1 Drawing Sheet

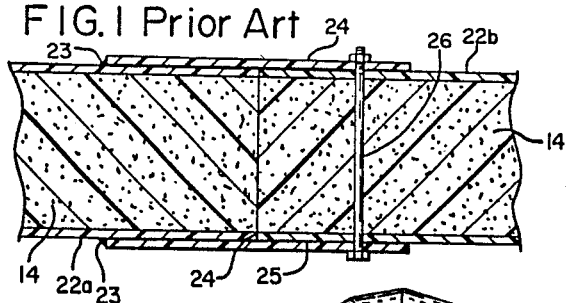
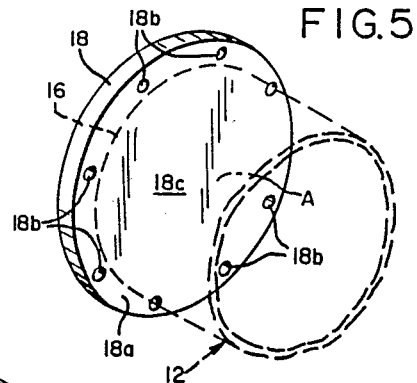
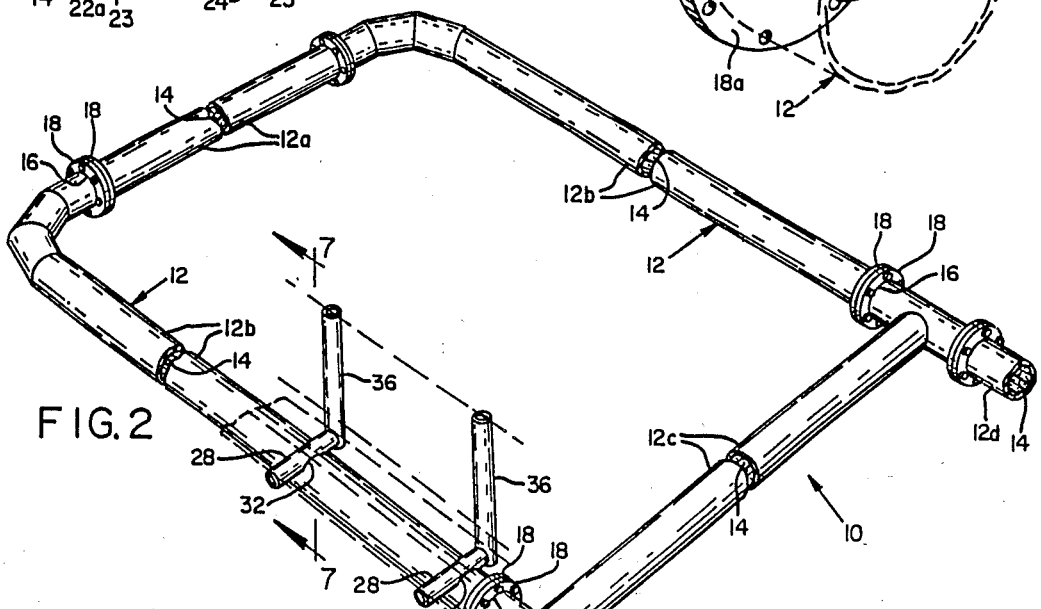
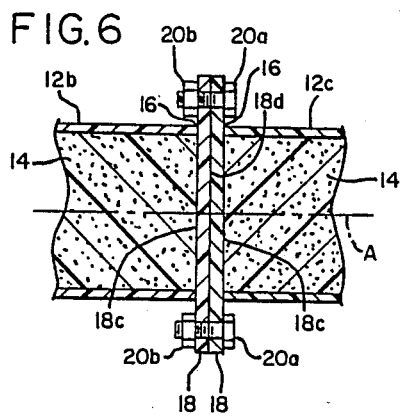
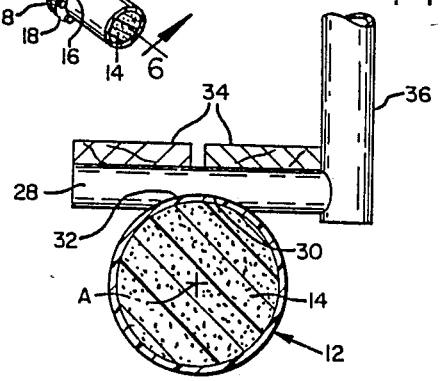
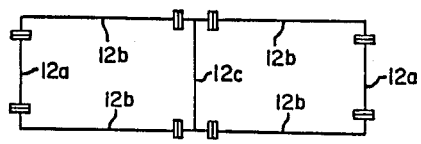
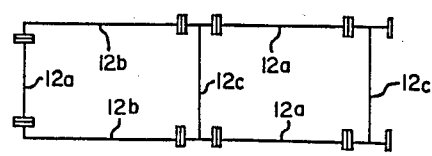

MODULAR FLOTATION SUPPORT COLLAR ASSEMBLY FOR AQUACULTURE FISH PEN

BACKGROUND OF THE INVENTION

The present invention is directed to a modular flotation support collar and to a method for construction thereof using interchangeable component parts. The method and component parts of the present invention are particularly suited for use in the construction of aquaculture fish pens.

Growing consumer awareness in recent years of the health benefits accruing from lower consumption of saturated fats and cholesterol in the diet has resulted in reduced consumption of red meats and increasing demand for seafoods, particularly fish. Traditional harvesting techniques, however, have been unable to meet this growing demand for seafood due in part to limited, and in many cases decreasing, supplies of fish, particularly the more popular species such as salmon. Efforts to economically satisfy this growing demand for seafood have turned to aquaculture thereby nourishing the expansion of the fish farming industry. Fish pens are also used by private organizations and state and federal agencies in fish enhancement programs directed to particular species.

Fish are typically grown in a system of moored or anchored fish pens. The pens are comprised of underwater net cages which permit good water flow through the pens. The upper portions of the net cages are supported by and secured to a buoyant surrounding structure, typically including spaced-apart flotation units supporting a interconnecting decking structure such as walkways one to four feet above the water. The walkways, which generally include stanchions for supporting hand railings and net attachments, are used by fish farmers in the course of manual or automatic fish feeding, fish inspection, and storage of supplies, as well as for access to nets in the course of maintenance tasks. Flotation structures having spaced-apart flotation units expose the netting to damage from driftwood or other floating debris. Those structures having metal, styrofoam or wooden component parts are subject to damage from attack by salt water, petrochemical pollution or sea worms. When subjected to wave action, such flotation structures are frequently noisy and subject to excessive wear and reflex movements, all of which are disturbing to the fish and limit the life of the assembly.

Full perimeter floating tubular collars made from single or double floating plastic pipes are becoming more popular, particularly in environments prone to strong winds and significant wave action. Such collars provide substantial floating capacity while their position directly on the water surface offers a minimal profile to wind. The low profile also minimizes reflex movements due to wave action, resulting in a more gentle undulating motion transmitted to the net which, in turn, is less disturbing to the fish and contributes to increased yields. Such collars also act as a trash and log barrier substantially blocking debris from contact with the netting.

In general, tubular support collars for marine applications are assembled from tubular segments filled with flotation material such as polystyrene. The abutting ends of adjoining segments are typically joined by an oversleeve which is welded to one end of a tubular segment and joined by a pin or similar connector to the adjacent tubular segment. Such connections, however, are not waterproof and are subject to infiltration by water which may eventually deteriorate the low density flotation material and reduce the collar buoyancy.

A more serious problem is that the oversleeve must be large enough to readily slip over the tubular segments during assembly of the flotation collar—often in situ under adverse construction conditions. The tolerances required for assembly purposes creates looseness or "slop" in the joint connection. Wave action, working continuously on the loose joint slop may eventually cause the connection to weaken and fail.

Finally, aquaculture flotation collar assemblies generally employ double, parallel tubular segments joined along their facing inner perimeters by a plurality of separators which serve as a support for planking or other walkway material. Such a walkway configuration is not only potentially unsafe for users because it is subject to "swamping" from even relatively minimal wave action, but is also subject to damage and fouling from marine contamination thereby requiring more frequent cleaning, repair, and/or replacement.

A need exists for a modular flotation support collar assembly which is sealed from infiltration of water during use and in the course of in-water assembly, and for a method of joining component parts of such an assembly together with a connecting joint that will resist working apart due to wave action. A need also exists for such an assembly having walkways positioned above the reach of normally encountered wave action.

SUMMARY OF THE INVENTION

The present invention is directed to a marine flotation collar particularly suited for aquaculture applications which addresses the aforementioned deficiencies of the prior art in a mutually compatable fashion. The invention provides for a watertight closure for sealing the open ends of each collar segment, the closure providing means for achieving a strong wave-resistant watertight joint connection. Collar segments of varying configurations are assembled end-to-end so as to construct a collar assembly of desired size and shape to suit a particular application.

In a preferred embodiment of the flotation collar assembly the watertight closures include a plurality of sealed bulkheads each having a peripheral connecting flange and joined by a watertight weld to the respective ends of each one of the collar segments so as to convert the collar segment into a sealed watertight enclosure. The flanged bulkhead closures serve to radially align and transmit torque between adjacent collar segments and to provide for durable interconnection of the collar segments. The connection means used for joining the respective flanges of abutting collar segments is preferably capable of being disengaged without damage to the flanges or to the collar assembly so as to allow for the addition, deletion or realignment of the sealed component collar segments which make up the collar assembly to respond to environmental or production requirements. Such connection means could include, for example, bolts received by respective aligned apertures in adjoining bulkhead flanges.

Located on the top of the collar assembly are a plurality of elongate tubular members arranged transversely and welded to the collar segments, each tubular member formed to have an arcuate recess which conforms to the transverse outer perimeter of the respective collar segment.

Accordingly, it is a principal object of the present invention to provide a watertight interconnection between adjoining segments of a marine flotation collar assembly.

It is a further object of the invention to provide sealed and seaworthy connection means between adjacent collar segments.

It is a further object of the present invention to provide individually sealed and seaworthy standard component collar segments which can be used to construct collar assemblies of various configurations.

It is a still further object of the invention to provide for assembly modularity by permitting disengagement and reassembly of adjoining collar segments without damage to the components or infiltration of seawater.

It is yet a further object of the invention to provide for the construction of an elevated walkway assembly alternatively on a single or multiple collar assembly design.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a sectional side view of a connection of two flotation collar segments according to the prior art.

FIG. 2 is a perspective view of an exemplary embodiment of a flotation collar assembly constructed in accordance with the present invention.

FIG. 3 is a schematic illustration of a first exemplary modular configuration of the collar assembly of FIG. 2.

FIG. 4 is a schematic illustration of a second exemplary modular configuration of the collar assembly of FIG. 2.

FIG. 5 is a perspective view of a bulkhead for use in accordance with the present invention.

FIG. 6 is a sectional view taken along line 6—6 of FIG. 2.

FIG. 7 is a sectional view taken along line 7—7 of FIG. 2.

DETAILED DESCRIPTION OF THE INVENTION

Referring to the drawings, a preferred embodiment of the present invention is shown in FIG. 2 as comprising a marine flotation support collar assembly 10 for use in aquaculture fish pens, particularly in fish farming applications. The collar assembly floats at the water surface and serves to secure the upper periphery of an underwater net cage and thereby support the open netting at the water surface. The assembly 10 includes a plurality of elongate tubular segments 12. The segments are of a durable, light-weight plastic construction, such as a high molecular weight, high density polyethylene, which is impervious to water, highly resistant to puncturing and is resistant to fouling from ice, marine life and contamination. Such material can also be easily formed during manufacture to the required segment shapes and sizes.

For example, the substantially rectangular assembly configuration shown in FIG. 2 includes a straight segment 12a, two right-angled segments 12b and a "double-T" segment 12c. The modularity of the segments, as herein described below, provides sufficient interchangeability to achieve a variety of assembly configurations, two examples of which are schematically illustrated in FIGS. 3 and 4. Generally, the tubular segments 12 are filled with a low density material 14, preferably a plastic such as polystyrene, so as to maintain high buoyancy and to inhibit infiltration of water in the event of damage to the segments 12 or their interconnection.

The ends of the tubular segments 12 are individually sealed by a heat or chemical weld to a bulkhead 18. As best seen in FIG. 5, the exemplary bulkheads 18 are circular, planar plates, preferably constructed of polyethylene, and have a diameter greater than that of the tubular segments 12. The intersection of a respective end of a segment 12 with the bulkhead 18 defines a flange 18a along the perimeter of the bulkhead. Each bulkhead 18 is provided with a plurality of apertures 18b positioned around the flange 18a and indexed so as to provide for alignment of the apertures of opposing pairs of bulkheads.

The ends of the tubular segments 12 have a central axis A and are arranged so that an inner face 18c of a respective bulkhead 18 is transversely intersected by the central axis A. Watertight weld connections 16 individually seal the interior of each tubular segment. When so sealed the segments 12 are assembled as illustrated in FIG. 6 to achieve a collar assembly of desired configuration by selecting adjoining component segments from among prefabricated segment shapes 12a, 12b, 12c and abutting the respective exterior bulkhead plate faces 18d so as to align the apertures 18b. The adjoining segments 12 are connected using a plurality of threaded bolts 20a each of which is received by an aligned pair of apertures 18b and removably secured therein by an opposing, threaded receiving nut 20b. Connection of the segments in this way forms a secure, watertight and torque transmitting junction of adjoining segments and constitutes a substantial improvement over prior art segment connections.

Such prior art techniques, as seen, for example, in FIG. 1, secure adjoining segments 22a, 22b by employing a tubular sleeve 24 which fits over adjoining segment ends. Typically, the sleeve 24 would then be heat welded or chemically welded along the adjoining perimeter 23 to the first segment 22a. The sleeve 24 and second segment 22b are held by a pin 26 secured transversely through the adjoining perimeter 25 of the sleeve and second segment. The inner diameter of the sleeve must be sufficiently greater than the outer diameter of the segment to allow the assembly of the flotation collar on site, often under adverse conditions. The tolerances required for assembly create a loose joint which can be worked by wave action, sometimes causing failure of the joint. Nor are such prior art connections watertight, allowing infiltration of water, particularly along the perimeter 25 and at the external protrusions of pin 26.

As shown in FIG. 2, the collar assembly 10 may include a system of elongate tubular members 28 arranged in a horizontal plane transversely atop the segments 12. As best seen in FIG. 7, the members 28 each have a recess 30 formed therein which conforms to the transverse upper perimeter 32 of a respective segment 12. The intersection of the recess 30 and perimeter 32 are securely bonded by a weld. Of course, the members 28 could bridge a plurality of parallel segments 12. The horizontal plane defined by the members 28 support a walkway of wooden planking 34 or other suitable material. A vertical stanchion 36 may be constructed at the respective ends of the members 28 for receiving supports for a hand railing, not shown, and for supporting the upper perimeter of the netting sufficiently above the water surface to prevent the escape of fish from the pen.

It should be understood that the watertight component segments of the collar assembly may be constructed in a manufacturing location and then transported to the "use" site where the component parts are assembled into fish pens of desired configuration. Preferably, the tubular members 28 comprising the walkway support would be affixed to the component segments at the manufacturing location.

Referring to FIG. 2, it can be seen that the straight segment 12a defines a single central longitudinal axis; right-angled segment 12b defines two or more non-parallel central longitudinal axes; and "double-T" segment 12c defines three central longitudinal axes, two of which are parallel to and spaced apart from each other.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A flotation support collar assembly for an aquaculture fish pen, comprising:
   (a) a plurality of elongate tubular segments, each one of said segments having open ends, each of said open ends defining a central axis;
   (b) a plurality of bulkhead means for respectively sealing said open ends, each of said bulkhead means joined to a respective open end of one of said segments so as to form a watertight closure thereof, said bulkhead means having a planar surface perpendicular to said respective central axis, said planar surface including a flange portion extending peripherally from said bulkhead means;
   (c) connection means for interconnecting said segments flange-to-flange.

2. The flotation support collar of claim 1 wherein said flanges have a plurality of apertures therethrough for receiving said connection means.

3. The flotation support collar of claim 2 wherein said connection means includes a plurality of fasteners each one of which is received by aligned apertures of opposing pairs of said flanges.

4. The flotation support collar of claim 1 wherein one of said elongate tubular segments defines two or more non-parallel central longitudinal axes.

5. The flotation support collar of claim 1 wherein one of said elongate tubular segments defines at least first and second central longitudinal axes perpendicular to each other.

6. The flotation support collar of claim 5 wherein said tubular segment includes a third central longitudinal axis parallel to and spaced apart from said first central longitudinal axis.

7. The flotation support collar of claim 1 wherein said elongate tubular segments and respective bulkhead means define a sealed enclosure, said support collar including flotation material within said sealed enclosure.

8. The flotation support collar of claim 1 further including a plurality of elongate tubular members arranged transversely to said segments, each tubular member having a recess formed therein conforming to the transverse outer perimeter of an associated one of said segments.

9. The flotation support collar of claim 1 wherein said tubular segments are high molecular weight polyethylene.

10. A modular aquaculture support collar assembly for the construction of one or more fish pens in a variety of configurations comprising:
    (a) one or more first tubular segments which are straight;
    (b) one or more second tubular segments which substantially define a right angle; (c) one or more third tubular segments having a straight central portion having two ends and including a pair of parallel end portions crossing said respective ends substantially perpendicular to said central portion;
    (d) each of said segments having open ends defining a central axis at each of said ends;
    (e) a plurality of bulkheads, each having an integral flange, sealingly engaged to a respective one of said open ends so as to form a planar surface perpendicular to a respective central axis; and
    (f) means for interconnecting said tubular segments flange-to-flange.

11. A method of modular flotation collar assembly comprising:
    (a) providing elongate tubular segments having open ends defining central longitudinal axis at each of said ends;
    (b) sealing the ends of said tubular segments with planar bulkhead flanges extending substantially transverse to said central longitudinal axes, said flanges including portions which extend peripherally from said tubular segments; and
    (c) interconnecting said tubular segments flange-to-flange in a desired configuration by interconnecting said peripherally extending portions of said flanges.

12. The method of claim 11, further including the step of arranging a plurality of elongate tubular members transversely to said segments.

* * * * *

UNITED STATES PATENT AND TRADEMARK OFFICE
CERTIFICATE OF CORRECTION

PATENT NO. : 4,886,015
DATED : Dec. 12, 1989
INVENTOR(S) : Gordon M. Ochs

It is certified that error appears in the above-identified patent and that said Letters Patent is hereby corrected as shown below:

Col. 2, Line 11: Change "fall" to --fail--.

Col. 4, Line 27: Insert a space between "12c" and "and".

Col. 6, Line 25: Separate from section (b) "(c) . . . . . . .portion;" and make a separate section (c) to conform with other sections in Claim 10.

Signed and Sealed this

Sixth Day of August, 1991

Attest:

HARRY F. MANBECK, JR.

*Attesting Officer*     *Commissioner of Patents and Trademarks*